Dec. 9, 1930.                E. J. OLSEN                1,784,705
AUXILIARY AIR PRESSURE STOP
Filed Oct. 18, 1928
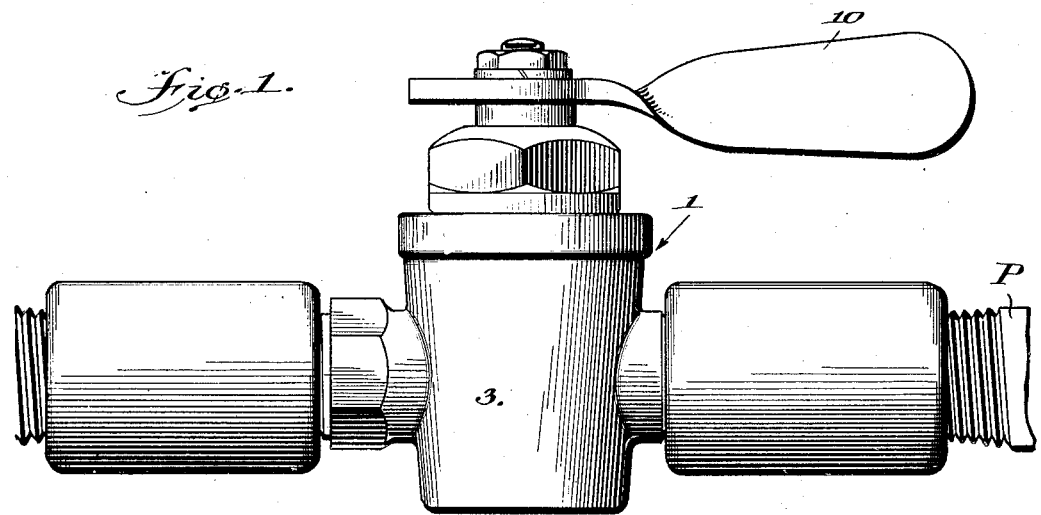
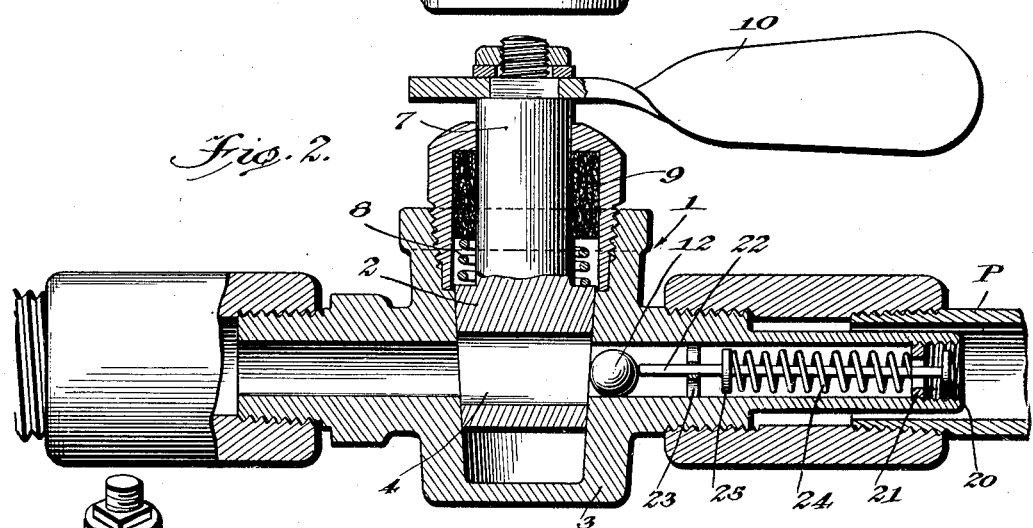
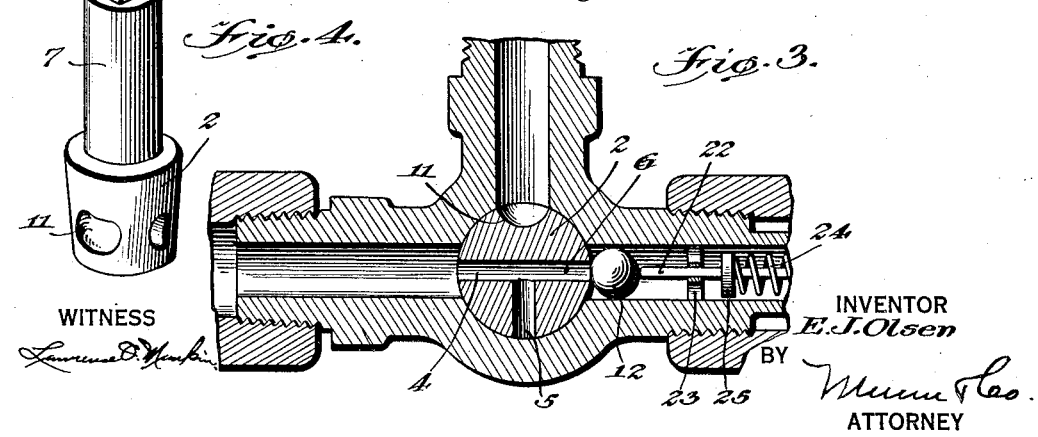
WITNESS
INVENTOR
E. J. Olsen
BY
ATTORNEY Patented Dec. 9, 1930

1,784,705

UNITED STATES PATENT OFFICE

EMIL J. OLSEN, OF NORTH ST. PAUL, MINNESOTA, ASSIGNOR OF ONE-FOURTH TO EMELIA OLSEN, ONE-FOURTH TO CORRINE OLSEN, AND ONE-FOURTH TO VERNON OLSEN, OF ST PAUL, MINNESOTA

AUXILIARY AIR-PRESSURE STOP

Application filed October 18, 1928. Serial No. 313,319.

This invention relates to air valves of the three way and straight friction plug type.

It is well known that valves of this type will not hold air at high pressure such as a hundred pounds or more and it is the primary object of this invention to so construct and equip such a valve that it will not leak under any pressure.

Another object is to provide a valve of this character equipped with an auxiliary air pressure stop which renders the valve absolutely air tight under all conditions.

Another object is to provide a valve between the tank pressure and the friction plug valves usually employed and provides means between said valves whereby the pressure controlling valve is automatically opened and closed on moving the valve from one position to another, the valve operating to switch the compressed air from one gate to another.

In carrying out these objects, the invention is susceptible of a wide range of modification without departing from the spirit or sacrificing any of the advantages of the claimed invention; there being shown in the drawings for illustrative purposes a preferred and practical form, in which:

Figure 1 represents a side elevation of a valve constructed in accordance with this invention;

Fig. 2 is a longitudinal section thereof with parts in elevation;

Fig. 3 is a horizontal section with certain parts broken out; and

Fig. 4 is a detail perspective view of the friction plug valve, constituting a part of this invention.

In the embodiment illustrated a three way valve of the friction plug type is shown at 1, the valve 2 of which is frictionally mounted in the three way valve casing 3 and has three passages extending transversely thereof as shown at 4, 5 and 6, designed to switch the pressure fluid admitted through pipe P and controlled by a valve 20 presently to be more fully described.

The valve 2 has a reduced shank 7 around which is coiled a spring 8 which operates to hold the valve seated, the usual gasket or bushing 9 being provided. This stem has the ordinary operating lever 10 fastened to its outer end so that the valve may be rotated to change the location of the various passages in regard to the passages in the valve casing.

This valve 2 in addition to the air passages therein is provided at one side with a seat or socket 11 designed to receive a ball 12 when the valve is turned so as to cut off the communication between the passages therein and in the valve casing. This ball in connection with the valve operates as a cam for opening the valve 20 which controls the inlet of the pressure fluid. This valve 20 is made in the form of a disc valve and is designed to engage a seat 21 located in one arm of the valve casing 3 as is shown clearly in Fig. 2 and between which and the inner face of the valve may be located a gasket to insure the tight closing of the valve when the pressure fluid forces it outwardly. A stem 22 carried by the valve 20 extends through the valve seat 21 and through a guide 23 and projects a sufficient distance to be engaged by the ball 12 when the latter is not seated in the socket 11 and when these parts are so engaged the ball will operate to force the valve from its seat against the tension of a coiled spring 24 which encircles the valve stem 22 and bears at one end against the seat 21 and at the other end against a stop 25 on said stem, said spring operating normally to close the valve so that in addition to the pressure of the fluid it will be securely and firmly seated in leak proof relation to the seat 21.

It will thus be seen that by employing the valve 2 in conjunction with the spring valve 20 and locating the cam ball 12 between them in the path of the stem 22 with the valve 20 exposed to the pressure of the fluid in pipe P the valve 20 will automatically open and close as the valve 2 is moved from one position to another, the valve operating as a switch to conduct the pressure fluid from one gate to another, the opening and closing of the valve 20 being accomplished by means of the cam ball 12 controlled by valve 2.

It will thus be obvious that this valve will be useful in any air line where it is desired to control the air supply therethrough and it does not in any way alter the lever operation of the valve, the auxiliary stop being concealed in the valve casing.

Without further description it is thought that the features and advantages of the invention will be readily apparent to those skilled in the art, and it will, of course, be understood that changes in the form, proportion and minor details of construction may be resorted to, without departing from the spirit of the invention or its scope as claimed.

I claim:

In a valve of the character described, a casing having a bore and three tubular members projecting therefrom and communicating with the bore, one of the members forming an inlet, a rotary plug valve in the bore of the casing and having three passages and a recess in its periphery opposite one of the passages, a valve seat and guide in the inlet member of the casing, the seat being near its outer end and the guide adjacent its inner end, a disc valve in the outer end of said tubular member and having a stem extending through the valve seat and guide and provided with a stop, a spring on the valve stem between the valve seat and stop, and a ball loose in the inlet member between the end of the valve stem and the plug valve, whereby the disc valve will be held open until the ball enters the said recess which will be closed.

EMIL J. OLSEN.